United States Patent [19]
Taylor

[11] 4,298,675
[45] Nov. 3, 1981

[54] NOVEL POLYMERIC MORDANTS FOR PHOTOGRAPHIC DYES

[75] Inventor: Lloyd D. Taylor, Lexington, Mass.

[73] Assignee: Polaroid Corporation, Cambridge, Mass.

[21] Appl. No.: 99,755

[22] Filed: Dec. 3, 1979

[51] Int. Cl.³ .............. G03C 1/40; G03C 5/54; G03C 7/00
[52] U.S. Cl. ................... 430/213; 430/238; 430/941
[58] Field of Search .............. 430/213, 238, 941, 371, 430/518, 627; 101/464; 528/210, 211; 428/411; 8/467

[56] References Cited

U.S. PATENT DOCUMENTS

| | | | |
|---|---|---|---|
| 3,248,279 | 4/1966 | Geyer | 162/138 |
| 3,262,911 | 7/1966 | Hay | 260/47 |
| 3,334,069 | 8/1967 | Borman | 260/47 |
| 3,709,690 | 1/1973 | Cohen et al. | 430/213 |
| 3,756,814 | 9/1973 | Bedell | 430/213 |

OTHER PUBLICATIONS

Daly et al. "Chloromethylation of . . . Backbone", *Polymer Preprints*, vol. 20, 4/1979, pp. 835–837.

*Primary Examiner*—Richard L. Schilling
*Attorney, Agent, or Firm*—John J. Wasatonic

[57] ABSTRACT

Photographic film units and photographic products and processes using polyphenylene ethers which provide pendant quaternary nitrogen groups as mordants for diffusible dye image-providing materials.

50 Claims, 3 Drawing Figures

NOVEL POLYMERIC MORDANTS FOR PHOTOGRAPHIC DYES

BACKGROUND OF THE INVENTION

1. The Field of the Invention

This invention relates to photographic products and processes and particularly to image-receiving layers used in diffusion transfer photographic products and processes.

2. Description of the Prior Art

Diffusion transfer photographic products and processes are well known to the art. Essentially, such products and processes involve film units having a photosensitive element comprising a photosensitive system which includes at least one selectively sensitized silver halide emulsion layer having associated therewith an image dye-providing material. After photoexposure, the photosensitive system is developed to establish an imagewise distribution of diffusible image dye-providing material and at least a portion of the diffusible image dye-providing material is transferred to an image-receiving layer comprising a material which can mordant or otherwise fix the diffusible dye. Details relating to diffusion transfer photographic products can be found, for example, in U.S. Pat. Nos. 2,983,606; 3,345,163; 3,415,644; 3,415,645; 3,415,646; 3,473,925; 3,482,972; 3,551,406; 3,573,042; 3,573,043; 3,573,044; 3,576,625; 3,576,626; 3,578,540; 3,579,333; 3,594,164; 3,594,165; 3,597,200; 3,647,437; 3,672,486; 3,705,184; 3,752,836; 3,857,855; 4,003,744; and British Pat. No. 1,330,524.

The image-receiving layer retains the transferred dye for viewing and in some diffusion transfer products, the image is viewed in the layer after separation from the photosensitive system while in other products such separation is not required.

Various polymeric materials have been employed as image-receiving layers of diffusion transfer photographic products. Such materials include polymeric materials which provide quaternary nitrogen groups and the use of these polymers in photographic products and/or processes is described, for example, in U.S. Pat. Nos. 3,239,337; 3,303,376; 3,698,896; 3,709,690; 3,721,556; 3,756,814; 3,758,445; 3,770,437; 3,898,088; 3,944,424; 3,958,995; 4,124,388.

The polymeric backbones used in the prior art to provide quaternary nitrogen groups include acrylates, polyvinyl compounds such as polystyrenes, polyvinyl alcohol, and polyvinyl pyridines, gelatins, celluloses, starches and starch oxides, polymeric saturated cyclic ammonium salts, and various copolymers and graft copolymers of the above.

The present invention presents to the art the novel use of linear aromatic polymers, specifically, polyphenylene ethers, which provide pendant quaternary nitrogen groups as mordants for diffusible image dye-providing materials.

SUMMARY OF THE INVENTION

The present invention is directed toward novel photographic products and processes comprising polyphenylene ethers having quaternary nitrogen groups pendant to the polymer backbone. In particular, these products and processes comprise image-receiving layers which comprise the polyphenylene ethers as polymeric mordant materials.

It is thus an object of the present invention to provide novel image-receiving elements comprising a support carrying an image-receiving layer comprising, as a mordant material, a polyphenylene ether having quaternary nitrogen groups pendant to the polymer backbone.

It is another object of the present invention to provide novel diffusion transfer film units comprising a photosensitive system including at least one silver halide emulsion layer associated with a diffusion transfer process image dye-providing material and an image-receiving layer comprising a polyphenylene ether having quaternary nitrogen groups pendant to the polymer backbone.

It is a further object of the present invention to provide a process for forming diffusion transfer images which comprises transferring by imbibition an imagewise distribution of a diffusible image dye-providing material to an image-receiving layer comprising a polyphenylene ether having quarternary nitrogen groups pendant to the polymer backbone.

Other objects of the invention will in part be obvious and will in part appear hereinafter.

These and other objects are accomplished using a polymeric mordant comprising recurring units of the following formula:

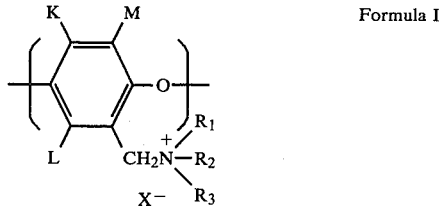

Formula I where K, L, and M can each independently be hydrogen; lower alkyl; cycloalkyl; lower alkoxy; aryl such as phenyl or naphthyl; aryloxy such as phenyloxy or tolyloxy; aralkyl such as benzyl; alkaryl such as tolyl; or halogen; and, in addition, M can be

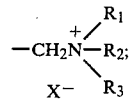

each of $R_1$, $R_2$, and $R_3$ can independently be lower alkyl; substituted lower alkyl; cycloalkyl; aryl; aralkyl; alkaryl; or at least two of $R_1$, $R_2$, and $R_3$ and the nitrogen atom to which they are bonded can constitute a substituted or unsubstituted heterocyclic ring; and $X^-$ is an anion such as halide.

For a fuller understanding of the nature and objects of the invention, reference should be had to the following detailed description taken in connection with the accompanying drawings.

DETAILED DESCRIPTION OF THE INVENTION

Figure 1:
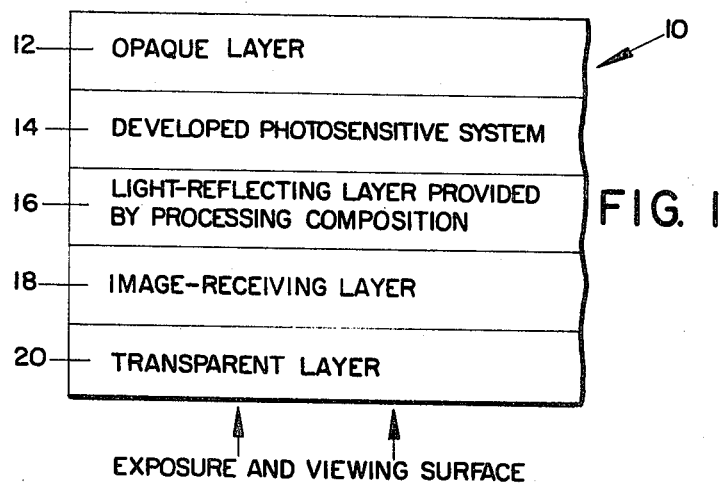
FIGS. 1, 2 and 3 are simplified schematic views of arrangements of essential elements of preferred film units of the present invention, shown after exposure and processing.

As mentioned previously, the present invention is directed toward novel photographic products and processes comprising, as a mordant material, polyphenylene ethers having quaternary nitrogen groups pendant to the polymer backbone. When utilized in the image-receiving layers of the photographic products and processes of this invention, these polymeric mordant materials function to fix or mordant diffusible image dye-providing materials. Thus, color images can be formed in image-receiving layers comprising the polymeric mordants of the present invention by transferring to the image-receiving layer an imagewise distribution of diffusible image dye-providing material and utilizing the polymeric mordant to fix and hold the transferred dye in the layer.

As illustrated by Formula I, the polymeric modants of the present invention comprise recurring phenylene ether units substituted with at least one quaternary ammonium methyl group. These phenylene ether units can be further substituted at the other available positions of the phenylene ring. It will be appreciated that useful polymeric mordants within the scope of the present invention can be homopolymers comprising a single type of quaternary nitrogen group pendant to identically substituted phenylene ether units, i.e., $R_1$, $R_2$, $R_3$, K, L, M are the same on each phenylene ether unit, or copolymers comprising differently substituted quaternary nitrogen groups or differently substituted phenylene ether units.

A wide variety of quaternary nitrogen groups can be used in the present invention. The quaternary nitrogen atom can be substituted with lower alkyl groups such as methyl, ethyl, propyl, or butyl; substituted lower alkyl groups such as hydroxyethyl, hydroxypropyl, or 3-(2-pyrrolidonyl)propyl; cycloalkyl groups such as cyclohexyl; aryl groups such as phenyl or naphthyl; aralkyl groups such as benzyl; alkaryl groups such as tolyl; or the substituents together with the quaternary nitrogen atom can form a saturated or unsaturated substituted or unsubstituted, N-containing heterocyclic ring system such as morpholino, piperidino, N'-formlypiperazino, or 1-pyridyl. It will be appreciated that formation of a saturated N-containing heterocyclic ring will involve two of $R_1$, $R_2$, and $R_3$ while formation of an unsaturated ring such as 1-pyridyl will involve each of $R_1$, $R_2$, and $R_3$.

The choice of a particular substituent or substituents on the quaternary nitrogen atom can depend on the mordanting characteristics thereby imparting to the polymer as well as other related characteristics such as solubility, swellability, and coatability. Those polyphenylene ethers comprising differently substituted quaternary nitrogen atoms pendant to the same polymer backbone may combine the individual characteristics of the quaternary nitrogen groups or possess properties intermediate thereto. For example, the ability of the mordant material to fix a variety of image dye-providing materials and provide a given dye density range for each dye may be adjusted or altered by substituting the polymer with different quaternary nitrogen groups having different mordanting properties.

The polymeric mordants of this invention can also comprise differently substituted polyphenylene ether units. The choice of the particular substituents K, L, and M of Formula I, can be made based on the properties imparted to the polymer such as swellability, solubility, and coatability, as well as synthetic considerations and the effect of the substituents on the mordanting properties of the polymer. Such variable substitution can be the result of the copolymerization of differently substituted parent phenol monomers as detailed in the preferred methods of synthesis described hereinafter.

Polyphenylene ethers of Formula I useful in the present invention can have from about 10% to about 100% of the recurring phenylene ether units substituted with at least one quaternary nitrogen group. In a preferred embodiment, at least 80% of the recurring phenylene ether units are substituted with at least one quaternary nitrogen group. In general, this higher degree of substitution imparts greater solubility to the polymer for purposes of coating and results in improved mordanting ability.

Polymeric mordants of Formula I can be prepared, for example, by known methods involving the reaction of a suitable tertiary amine with a halomethyl group attached to a phenylene ring of a polyphenylene ether. This reaction is illustrated by the following scheme:

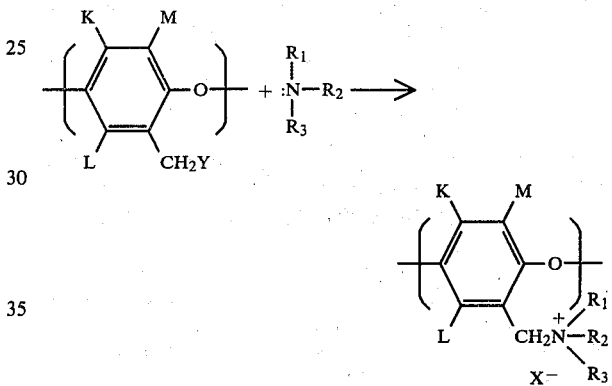

where L, K, M, $R_1$, $R_2$, $R_3$, and $X^-$ are as previously defined and Y can be chlorine or bromine. The reaction of halomethyl groups of polyphenylene ethers with tertiary amines is disclosed in U.S. Pat. Nos. 3,262,911 and 3,334,069. U.S. Pat. No. 3,248,279 describes the reaction of tertiary amines with the residual halomethyl groups attached to the phenylene rings of methylene diphenyl ether polymers. It will be understood, with respect to the above quaternization reaction, that ordinarily the anion $X^-$ will be Y at the completion of the reaction sequence but that anion exhange methods well known to the art can be used to prepare other salts wherein the anion can be other than chlorine or bromine.

The halomethylated polyphenylene ethers, used as the starting material in the above reaction sequence, can be prepared as illustrated in the following preferred reaction scheme (A):

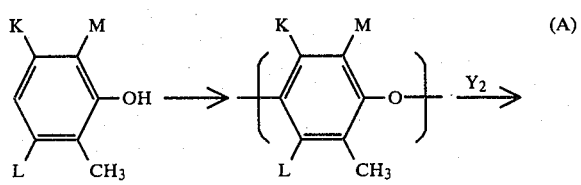

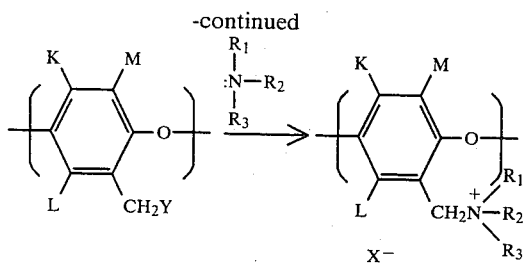

wherein $Y_2$ is molecular chlorine or bromine.

With respect to reaction scheme (A), it will be appreciated that substituent groups L, K, and M, as defined for Formula I, are preferably those which will allow suitable polymerization of the parent phenol and which will not themselves undergo halogenation or interfere with the subsequent quaternization reaction.

When prepared according to reaction scheme (A), the polymeric mordants of this invention will have the phenylene ring substituents L, K, and M determined by the choice of the starting 2-methylphenol. An exception to this occurs in those cases where either L, K, or M is hydrogen. In such cases, chlorination or bromination can occur at one or more of those sites originally occupied by hydrogen, effectively displacing the hydrogen substituent with a chlorine or bromine substituent. The degree to which this can occur is dependent on the particular halogenation reaction conditions. In a preferred embodiment of mordants of Formula I, both K and L are hydrogen and M is other than hydrogen such that the starting phenol of method (A) is a 2-methyl-6-substituted phenol. Mordants prepared from these phenols by method (A) may thus undergo some ring chlorination or bromination such that the polymer comprises recurring units wherein at least one of K and L is chlorine or bromine. In general, the extent of such substitution can be such that the polymer can comprise from about 10 mole precent aromatic chlorine or bromine, i.e., an average of one aromatic chlorine or bromine substituent per ten phenylene ether units, to about 200 mole percent aromatic chlorine or bromine, i.e., two aromatic chlorine or bromine substituents per phenylene ether unit. In a preferred embodiment, the polymeric mordant comprises about 50 mole percent aromatic chlorine or bromine or an average of one such substituent per two phenylene ether units.

It will be appreciated that the chlorine or bromine substitution is provided for in the polymers of the present invention prepared by method (A) due to the occurrence of such substitution during the halogenation step of that method and that, in general, neither the presence of such substituents nor the extent of the substitution is critical to the mordanting capability of the polymers of this invention.

The initial polymerization step of reaction scheme (A), an oxidative coupling of a 2-methylphenol, is well known to the art as disclosed in U.S. Pat. Nos. 3,134,753; 3,306,875; 4,092,294; and in an article by Hay, J.Polym. Sci. 58, 581(1962).

Methods of halogenating polyphenylene ethers having methyl groups in the 2- or 2,6-positions are also well known and are described in U.S. Pat. Nos. 3,262,911 and 3,334,069. U.S. Pat. No. 3,262,911 discloses that the degree of conversion of methyl groups to halomethyl groups and the degree of halogen ring substitution in those cases where K and L are hydrogen are determined by the relative proportions of the reagents and by the reaction conditions.

It will be understood that when M in the parent polymer is methyl it can, under appropriate reaction conditions disclosed in referenced U.S. Pat. No. 3,262,911, also be halogenated and reacted with a tertiary amine to provide a second quaternary nitrogen moiety on the phenylene nucleus.

In a preferred embodiment of the polyphenylene ethers of Formula I at least 80% of the phenylene ether units are substituted with at least one quaternary nitrogen moiety. Accordingly, in the preparation of such preferred compounds by method (A), the preferred degree of conversion of methyl groups to halomethyl groups is about 90% to about 100% and the preferred degree of quaternization is, similarly, about 90% to about 100%.

A second preferred method by which polymeric mordants of Formula I can be prepared is illustrated in reaction scheme (B):

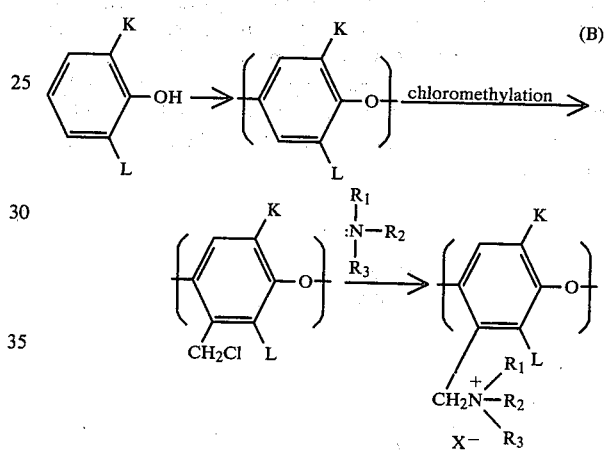

It will be appreciated that the end product of this reaction sequence is a polymer of Formula I wherein M is hydrogen. Method (B) provides additional flexibility in the choice of the starting phenol in that, unlike those phenols utilized in method (A), it need not be a 2-methylphenol. Further, since there is no halogenation step, K and L need not be preferably inert to halogenation reaction conditions.

The chloromethylation reaction can be carried out as detailed by Daly, et al. in Polymer Preprints, Vol. 20, No. 1, p. 835, April, 1979.

As is the case with the polymeric mordants prepared by method (A), the preferred embodiments of those prepared by method (B), have at least 80% of the phenylene ether units substituted with at least one quaternary nitrogen group. Accordingly, the preferred degree of chloromethylation is about 90% to about 100% of the phenylene ether units and the preferred degree of quaternization is, similarly, about 90% to about 100%.

It will be appreciated that those polyphenylene ethers prepared by methods (A) and (B) can be homopolymers wherein only one particular phenol is used as a starting material or copolymers wherein two or more differently substituted phenols are used as starting materials. Further, the halomethyl derivatives of these parent homo- or copolymers can be reacted with more than one tertiary amine, either simultaneously or sequentially depending on the relative degree of substitution required and/or the relative reactivity of the tertiary amines to prepare polymeric mordants containing more than one type of quaternary nitrogen group.

Further variation in the content of the polymeric material used as a mordant can be achieved by physically mixing two or more of the polymeric mordants of this invention to produce blends containing at least two different quaternary nitrogen groups. The polymeric mordants of this invention can also be blended with other polymeric mordants known to the art, such as poly-4-vinylpyridine or the acetal of a polyvinylalcohol and a formylbenzyl quaternary ammonium salt of the type described in referenced U.S. Pat. No. 4,124,388, to alter various properties of the polymeric mordant material such as swellability, coatability, or mordanting performance.

Particularly preferred polymers of the present invention are those of Formula I wherein M is methyl, $X^-$ is chloride, and at least one of K and L is chlorine such that the polymer comprises about 50 mole percent aromatic chlorine substituent. Also preferred are those polymers wherein M is hydrogen, K and L are methyl, and $X^-$ is chloride. Accordingly, representative polymeric compounds of this invention include those having recurring units conforming to the following specific formulae:

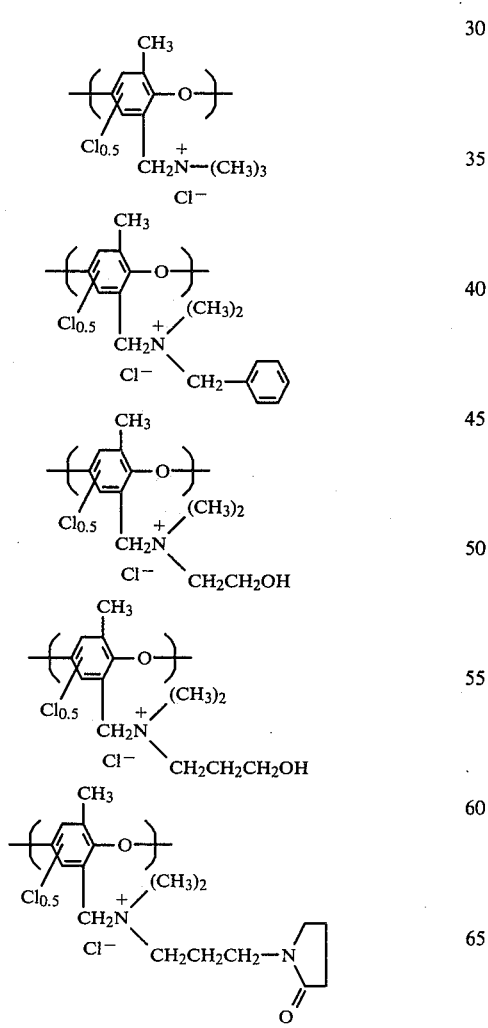

-continued

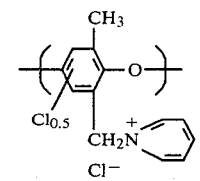

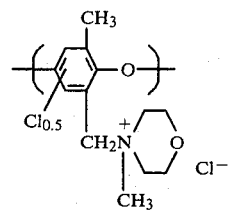

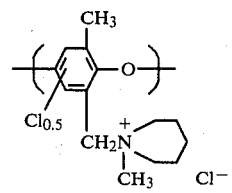

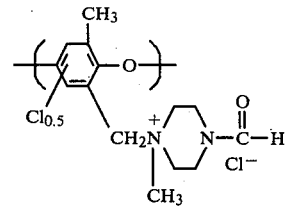

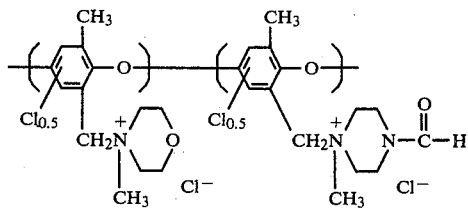

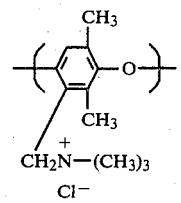

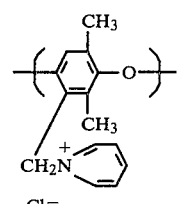

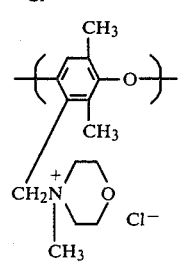

-continued

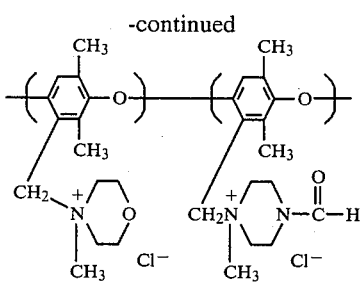

The products of the present invention comprise image-receiving layers which comprise the polyphenylene ether mordants represented by Formula I. The amount of polyphenylene ether mordant can vary from about 10% to about 100%, by weight, of the total polymeric material in the image-receiving layer. Particularly preferred are those image-receiving layers which comprise a mixture or blend of the polyphenylene ether mordant with other known polymeric image-receiving layer materials, particularly hydrophilic polymeric materials such as gelatin, polyvinylalcohol, polyvinylpyrrolidones, and mixtures of these. The materials chosen for blending with the mordant material and the relative amounts of each can depend, for example, on the dye to be mordanted, the amount of dye to be mordanted, the imaging chemistry involved, and the permeability of the image-receiving layer to the processing composition. Particularly preferred image-receiving layers comprise a mixture of polyphenylene ether mordant and polyvinylalcohol where the ratio by weight of polyvinylalcohol to polyphenylene ether is about 2:1 to about 5:1.

Image-receiving layers comprising the polyphenylene ether mordants of this invention can be utilized, for example, in image-receiving elements designed to receive and mordant image dye-providing materials. Such image-receiving elements can also comprise a support carrying the image-receiving layer comprising one or more of the polyphenylene ether mordants of this invention and also one or more polymeric acid layers such as those disclosed, for example, in U.S. Pat. No. 3,362,819. These polymeric acids can be polymers which contain acid groups, e.g., carboxylic acid and sulfonic acid groups, which are capable of forming salts with alkali metals or with organic bases; or potentially acid yielding groups such as anhydrides or lactones. The polymeric acid layer functions to reduce the environmental pH of the diffusion transfer system in which the image-receiving layer is utilized and, thereby, provides advantages and benefits well known in the art.

An interlayer or spacer layer may be disposed between the polymeric acid layer and the image receiving layer in order to control the pH reduction so that it is not premature and hence interferes with the development process, e.g., to "time" control the pH reduction. Suitable spacer or "timer" layers for this purpose are described, for example, in U.S. Pat. Nos. 3,362,819; 3,419,398; 3,421,893; 3,433,633; 3,455,686; 3,575,701; and 3,756,815.

The polyphenylene ether mordants of the present invention can also be utilized in photographic film units, particularly diffusion transfer photographic film units. Such diffusion transfer photographic film units can comprise, for example, a photosensitive system which includes at least one photosensitive silver halide emulsion layer having associated therewith a diffusion transfer process image dye-providing material, and can further comprise an image-receiving layer comprising the polyphenylene ether mordants of the invention. After photoexposure, development of the photosensitive system in manners well known to the art establishes an imagewise distribution of diffusible image dye-providing material which can diffuse or migrate to the image-receiving layer where it is mordanted or fixed to form a color image.

The diffusion transfer photographic film units can be of several types known to the art. They can, for example, comprise a photosensitive element comprising a support carrying a photosensitive system comprising at least one photosensitive silver halide emulsion layer associated with a diffusion transfer process image dye-providing material and an image-receiving element comprising a support carrying an image-receiving layer comprising the polyphenylene ether mordants of this invention. The image-receiving element can be superposed on the photosensitive element after photoexposure and an aqueous alkaline processing composition of the type known to the art can be spread between the superposed elements. Development of the photosensitive system establishes an imagewise distribution of diffusible image dye-providing material which is transferred to the image-receiving layer. The resultant color image is viewed in the image-receiving layer after separation of the image-receiving element from the photosensitive element.

The film units of the present invention can also be of the type generally known as integral negative-positive film units. Particularly preferred are those of the type described in detail in U.S. Pat. No. 3,415,644, hereby expressly incorporated by reference. These particularly preferred film units comprise: (a) a photosensitive element comprising a composite structure containing, as essential layers, in sequence, an opaque layer, preferably an actinic radiation-opaque flexible sheet material, a photosensitive system, which includes at least one photosensitive silver halide emulsion layer having associated therewith an image dye-providing material, an image-receiving layer dyeable by the image dye-providing material, and a transparent layer, preferably an actinic radiation transmissive flexible sheet material; and (b) means retaining an aqueous alkaline processing composition integrated with the film unit so that the processing composition can be distributed between the photosensitive system and the image-receiving layer. In this type of film unit a light-reflecting pigment is preferably provided by the processing composition such that the distribution of the processing composition between the photosensitive sytem and the image-receiving layer provides a light-reflecting layer against which a dye image formed in the image-receiving layer can be viewed.

A representative particularly preferred film unit is shown in FIG. 1, following exposure and processing. The film unit 10 includes a light-reflecting layer 16 provided by a light-reflecting pigment in a processing composition initially present in a rupturable processing container (not shown) and distributed after photoexposure of photosensitive system 14 through transparent layer 20 and image-receiving layer 18. Photosensitive system 14 is comprised of at least one photosensitive silver halide emulsion layer having associated therewith an image dye-providing material. Processing compositions used in such film units are aqueous alkaline photographic processing compositions comprising an opacifying system which include a titanium dioxide pigment as the light-reflecting agent, preferably in combination with an optical filter agent as described, for example, in U.S. Pat. No. 3,647,437. When the processing composition is distributed over all portions of photoexposed photosensitive system 14, a light-reflecting layer 16 comprising the titanium dioxide is provided between image-receiving layer 18 and photosensitive system 14. Application of the processing composition initiates developing of photoexposed photosensitive system 14 in manners well known to the art to establish an imagewise distribution of diffusible image dye-providing material. The diffusible image dye-providing material is transferred through permeable, light-reflecting titanium dioxide-containing layer 16 where it is mordanted, precipitated or otherwise retained in image-receiving layer 18. The transfer image is viewed through transparent layer 20 against light-reflecting layer 16.

Integral negative-positive film units of the type described in referenced U.S. Pat. No. 3,594,165, hereby expressly incorporated by reference, are also within the scope of the present invention. These film units comprise: (a) a photosensitive element comprising, as essential layers, in sequence, a transparent layer, preferably an actinic radiation transmissive flexible sheet material, an image-receiving layer, a processing composition permeable, light-reflecting layer against which a dye image formed in the image-receiving layer can be viewed, and a photosensitive system including at least one photosensitive silver halide emulsion layer having associated therewith an image dye-providing material; (b) a transparent sheet superposed substantially coextensive the surface of the photosensitive element opposite the transparent layer; (c) means retaining an aqueous alkaline processing composition, which includes an opacifying agent, integrated with the film unit such that the processing composition can be distributed between the photosensitive system and the transparent sheet.

Figure 2:
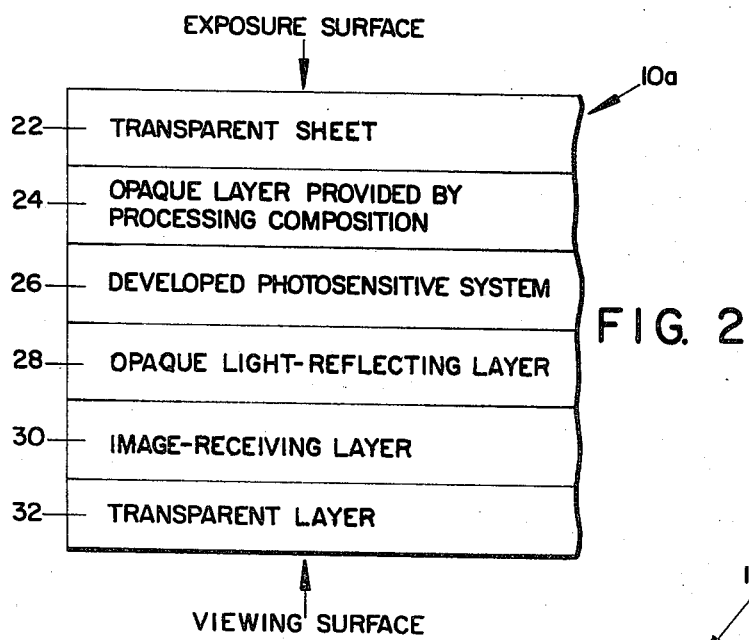

FIG. 2 shows a representative arrangement of the essential elements of this latter type of film unit following exposure and processing.

The film unit 10a includes a processing composition initially retained in a rupturable container (not shown) and distributed between transparent sheet 22 and photosensitive system 26, after photoexposure of photosensitive system 26 through transparent sheet 22. Photosensitive system 26 is comprised of at least one photosensitive silver halide emulsion layer having associated therewith an image dye-providing material. Processing compositions used in such film units are aqueous alkaline photographic processing compositions which include an opacifying agent which need not be—and usually is not—light-reflecting. Distribution of the processing composition between transparent sheet 22 and photoexposed photosensitive system 26 provides opaque layer 24 to protect photosensitive system 26 from further photoexposure through transparent sheet 22. Like the film units of FIG. 1, as and after opaque layer 24 is installed, the processing composition initiates developing of photoexposed photosensitive system 26 to establish an image-wise distribution of the image dye-providing materials in manners well known to the art. For example, the processing composition alone may contain developing agents or the agents may be initially positioned in the film unit such that they are carried to system 26 by the processing composition. The image-wise distribution is transferred through permeable, light-reflecting opaque layer 28 to image-receiving layer 30 wherein it is mordanted and subsequently viewed through transparent support 32 against the light-reflecting opaque layer 28. Opaque layer 28 may comprise substantially any light-reflecting opacifying agent compatible with the photographic system. A particularly preferred light-reflecting opacifying agent is titanium dioxide due to its highly effective reflective properties.

Figure 3:
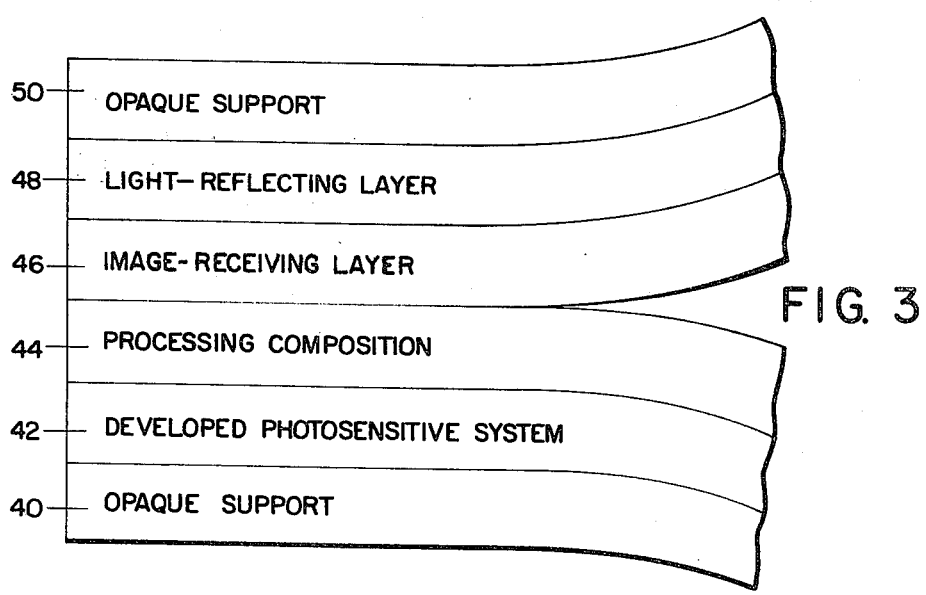

The novel polyphenylene ether mordants of the present invention also may be utilized in film units designed to be separated after processing. Such a diffusion transfer film unit of the present invention is shown in FIG. 3 as 10b. The film unit shown there comprises a photosensitive element having an opaque support 40 carrying a photosensitive system containing layer(s) 42. In film units of this type the photosensitive element is photoexposed and a processing composition 44 is then distributed over the photoexposed system and an image-receiving element comprising image-receiving layer 46 carried by support 50—preferably opaque—is superposed on the photoexposed photosensitive element. Like the film units of FIGS. 1 and 2, the processing composition permeates layer(s) 42 to provide an imagewise distribution of diffusible image dye-providing materials which is transferred to image-receiving layer 46. Unlike the film units of FIGS. 1 and 2, however, the transferred dye image is viewed in layer 46 against light-reflecting layer 48 after separation of the image-receiving element from the photosensitive element.

The diffusible image dye-providing materials used in the products and process of this invention can be complete dyes or dye intermediates, e.g., color couplers. Particularly preferred image dye-providing materials are the dye developers, i.e., compounds which contain, in the same molecule, both the chromophoric system of a dye and also a silver halide developing function. By "a silver halide developing function" is meant a grouping adapted to develop exposed silver halide. A preferred silver halide developing function is a hydroquinonyl group. Such dye developers are well known to art as described, for example, in U.S. Pat. Nos. 2,983,606; 3,196,014; 3,453,107; 3,482,972; 3,551,406; 3,752,836; and 3,857,855.

The mordants of this invention can also be used to fix or mordant diffusible image dye-providing materials made available by dye release mechanisms such as those described in U.S. Pat. Nos. 3,443,939; 3,443,940; 3,443,941; 3,719,488; 3,719,489; and 4,098,783.

The present invention is illustrated in greater detail in the following examples which are illustrative only and not intended to be of limiting effect.

EXAMPLE 1

Example 1 relates to the preparation of a polymeric mordant of Formula I illustrated by the following scheme:

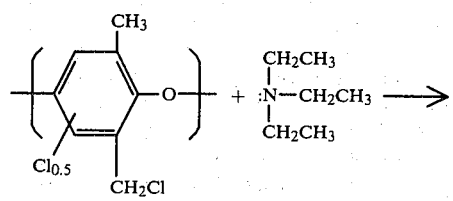

-continued

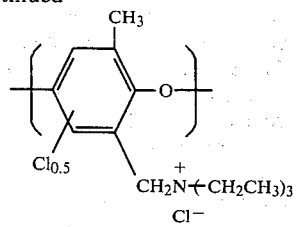

Accordingly, 20 gm. of poly [2-chloromethyl-6-methyl-1,4-phenylene ether] (hereinafter, chlorinated PPE) comprising, on a weight basis, about 30% chlorine of which 19.6% was on methylene indicating about one chloromethyl group per phenylene ether unit and 10.4% was on an aromatic ring indicating about one aromatic chlorine substituent per two phenylene ether units were dissolved in 100 ml. of methylene chloride. 35 ml. of methanol and 20 gm. of triethylamine were added and the mixture refluxed overnight. The methylene chloride was then removed by distillation, 100 ml. of methanol added, and refluxing then continued for 2 days. Dimethylformamide was then added and the methanol removed by distillation. The dimethylformamide solution was poured into acetone precipitating the polymer which was collected by filtration and then Soxhlet extracted with acetone for 2 days. The product was dried for 20 hours at 60° C. at 0.5 mm. of vacuum. Yield of poly[2-methyl-6-(triethyl ammonium)methyl-1,4-phenylene ether chloride] containing approximately one aromatic chlorine substituent per two phenylene ether units was 26.4 gm. which analyzed at 3.39 meq. Cl$^-$/gm. indicating an 88% conversion of chloromethyl to triethyl ammonium methyl, i.e., a degree of conversion of 0.88.

EXAMPLE 2

8 gm. of the chlorinated PPE of Example 1 were dissolved in 24 ml. of methylene chloride and 2.4 ml. of methanol and 12.65 gm. of N,N-dimethylbenzylamine were added and the mixture stirred at room temperature for one hour. 22 ml. of methanol were then added and the mixture stirred at room temperature overnight. 35 ml. of solvent were removed on an evaporator and 10 ml. of methanol added. After 24 hours at room temperature, the mixture was placed in an 80° C. bath for about 30 hours. After precipitation into ethyl acetate, the product was collected by filtration and then Soxhlet extracted with acetone for 8 hours. It was dried under 0.5 mm. vacuum at 35° C. for 24 hours. Yield of 12.25 gm. of poly [2-methyl-6-(N,N-dimethylbenzyl ammonium) methyl-1,4-phenylene ether chloride] containing approximately one aromatic chlorine substituent per two phenylene ether units which analyzed at 3.13 meq. Cl$^-$/gm. indicating a degree of conversion of 0.93.

EXAMPLE 3

10 gm. of the chlorinated PPE of Example 1 were dissolved in 40 ml. methylene chloride and 10 ml. of methanol and (10 gm.) of N-methylmorpholine added. The mixture was stirred at room temperature overnight. 36 ml. of methanol were then added and the methylene chloride removed by distillation. The mixture was then refluxed for four days, most of the methanol then removed by distillation, and 50 ml. of water and 5 ml. additional N-methylmorpholine added and the mixture maintained at 80° C. for 48 hours. The solution was then concentrated on an evaporator and precipitated into a large excess of acetone. The product was collected by filtration and Soxhlet extracted with acetone for 24 hours. The product was dried at 50° C. under 0.5 mm. of vacuum. Yield of poly[2-methyl-6-(N-methyl morpholino)methyl-1,4-phenylene ether chloride] containing approximately one aromatic chlorine substituent per two phenylene ether units was 13.5 gm. which analyzed at 3.35 meq. Cl$^-$/gm. indicating a degree of conversion of 0.87.

EXAMPLE 4

10 gm. of the chlorinated PPE of Example 1 were dissolved in 30 ml. of methylene chloride. 3 ml. of methanol and 15 gm. N-methyl-N'-formylpiperazine were added and the mixture stirred at room temperature. After 1 hour, 13 ml. of methanol were added and the mixture stirred overnight. 30 ml. of methanol were then added and 36 ml. of solvent removed by distillation. The reaction mixture was then heated to 80° C., maintained at that temperature for 24 hours, and then precipitated into acetone. The product was collected by filtration and Soxhlet extracted for 8 hours with acetone and dried for 48 hours at 40° C. under 0.5 mm. vacuum. Yield of 12.25 gm. of poly[2-methyl-6-(N-methyl-N'-formylpiperazino) methyl-1,4-polyphenylene ether chloride] containing approximately one aromatic chlorine substituent per two phenylene ether units which analyzed at 3.14 meq. Cl$^-$/gm. indicating a degree of conversion of 0.94.

EXAMPLE 5

The procedures of Example 4 were followed but 5.9 gm. of N-methylmorpholine and 7.5 gm. of N-methyl-N'-formylpiperazine were used rather than the 15 gm. of N-methyl-N'-formylpiperazine of Example 4. Yield of 15.5 gm. of a poly [2-methyl-6-(quaternary ammonium)methyl-1,4-polyphenylene ether chloride] containing approximately one aromatic chlorine substituent per two phenylene ether units and having as quaternary ammonium moieties a 58/42 w/w% mixture of N-methylmorpholine and N-methyl-N'-formylpiperazine. The degree of conversion of chloromethyl to quaternary ammonium methyl was 0.90.

EXAMPLE 6

10 gm. of the chlorinated PPE of Example 1 were dissolved in 30 ml. methylene chloride. 12 gm. of 3-(N,N-dimethyl) amino-1-propanol were added causing formation of a precipitate which redissolved within a few minutes. An exothermic reaction occurred which resulted in solidification of the solution. 30 ml. of methanol were added and the methylene chloride removed by distillation. The methanolic solution was maintained at 70° C. overnight and then precipitated into acetone. The product was collected by filtration, dissolved in a mixture of methanol and dimethylformamide, precipitated into acetone, and collected by filtration. The product was dried at 40° C. under 0.3 mm. vacuum. Yield of 16.4 gm. of poly[2-methyl-6-(N,N-dimethyl-N-(3-hydroxy)propyl ammonium)methyl-1,4-phenylene ether chloride] containing approximately one aromatic chlorine substituent per two phenylene ether units which analyzed at 3.80 meq. Cl$^-$/gm. for calculation of a degree of conversion of 1.03, indicating an effective degree of conversion of 100%.

EXAMPLE 7

10 gm. of the chlorinated PPE of Example 1 were dissolved in 30 ml. of methylene chloride. 20 gm. of 1-(N,N-dimethylamino)propyl-2-pyrrolidone were then added followed by the gradual addition of 30 ml. of methanol over about 10 minutes. The methylene chloride was removed by distillation and the methanolic solution was maintained at 70° C. overnight. The polymer was isolated by dilution of the methanolic solution with water followed by dialysis and then freeze drying. Yield of 18.5 gm. of poly[2-methyl-6-(N,N-dimethyl-N-(3-pyrrolidonyl)propyl ammonium)methyl-1,4-phenylene ether chloride] having approximately one aromatic chlorine substituent per two phenylene ether units which analyzed at 1.93 meq. Cl$^-$/gm. indicating a degree of conversion of 0.49.

EXAMPLE 8

A photosensitive element was prepared by coating a support consisting of a gelatin subcoated, four mil (0.1 mm), opaque polyethylene glycol terephthalate film base with the following layers:

1. a layer of a gelatin dispersion of a cyan dye developer, 2-phenylbenzimidazole, and 4'-methylphenylhydroquinone coated such that the coverages were about 758 mg./m.$^2$ of cyan dye developer, 271 mg./m.$^2$ of 2-phenylbenzimidazole, 68 mg./m.$^2$ of 4'-methylphenylhydroquinone, and 379 mg./m.$^2$ of gelatin;

2. a red sensitive gelatino-silver iodobromide emulsion layer consisting of a first layer of 1.05$\mu$ average mean volume diameter grains coated at a level of about 867 mg./m.$^2$ of silver and a second layer of 1.5$\mu$ average mean volume diameter grains coated at a level of about 455 mg./m.$^2$ of silver and about 758 mg./m.$^2$ of gelatin;

3. a layer of the copolymer butyl acrylate/diacetone acrylamide/styrene/methacrylic acid (60/30/4/6) coated at a coverage of about 2546 mg./m.$^2$ and about 78 mg./m.$^2$ of polyacrylamide;

4. a layer of a gelatin dispersion of a magenta dye developer and 2-phenylbenzimidazole coated at a coverage of about 650 mg./m.$^2$ of magenta dye developer, about 227 mg./m.$^2$ of 2-phenylbenzimidazole, and 455 mg./m.$^2$ of gelatin;

5. a green sensitive gelatino-silver iodobromide emulsion layer consisting of a first layer of 0.7$\mu$ average mean volume diameter grains coated at a level of about 390 mg./m.$^2$ and a second layer of 1.5$\mu$ average mean volume diameter grains at a level of about 412 mg./m$^2$ and about 390 mg./m.$^2$ of gelatin;

6. A layer of the copolymer butylacrylate/diacetone acrylamide/styrene/methacrylic acid (60/30/4/6) coated at a coverage of about 1376 mg./m.$^2$ and about 88 mg./m.$^2$ of polyacrylamide and about 71 mg./m.$^2$ of succindialdehyde.

7. a layer of a gelatin dispersion of a yellow dye developer and 2-phenylbenzimidazole coated at a coverage of about 975 mg./m.$^2$ of yellow dye developer, about 206 mg./m.$^2$ 2-phenylbenzimidazole, and about 455 mg./m.$^2$ of gelatin.

8. a blue sensitive gelatino-silver iodobromide emulsion layer consisting of 1.5$\mu$ average mean volume diameter grains coated at a coverage of about 1300 mg./m.$^2$ of silver and about 672 mg./m.$^2$ of gelatin and about 206 mg./m.$^2$ of 4'-methylphenylhydroquinone;

9. a layer of carbon black dispersed in gelatin and coated at a coverage of about 43 mg./m.$^2$ of carbon black and 487 mg./m.$^2$ gelatin.

The three dye developers employed above were the following:

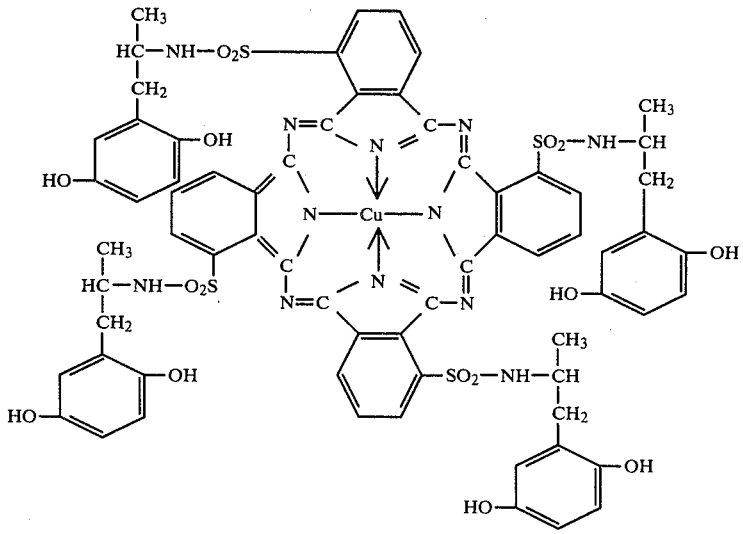

cyan:

magenta:

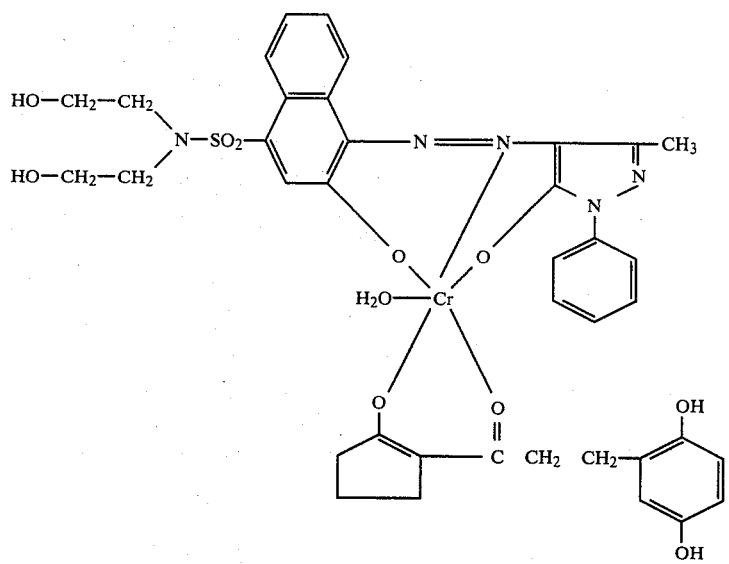

yellow:

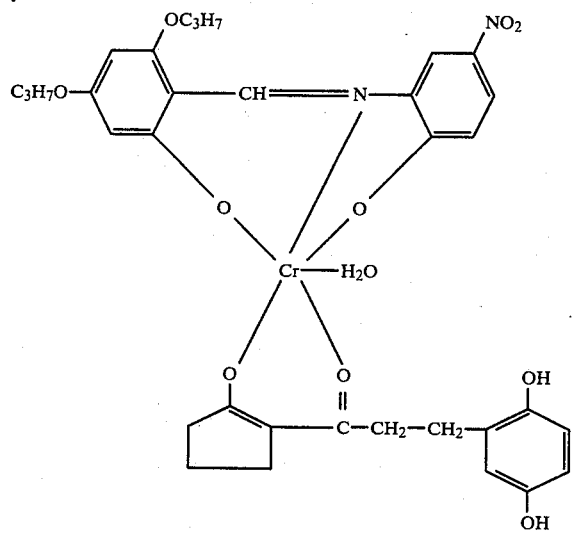

Image-receiving elements were prepared comprising the preferred image-receiving layers of this invention which comprised polymeric mordants having recurring phenylene ether units of Formula I wherein M is methyl, $X^-$ is chloride, at least one of K and L is chlorine such that the polymer comprises about 50 mole percent aromatic chlorine substituent, and $R_1$, $R_2$ and $R_3$ were as designated in Table I under "Tertiary Amine". Accordingly, a support consisting of transparent 4 mil. (0.1 mm) polyethylene glycol terephthalate film base was coated, in succession with the following layers:

1. as a polymeric acid layer, the partial butyl ester of polyethylene/maleic anhydride copolymer mixed with about 10% by weight of polyvinyl butyral and coated at a coverage of about 27,000 mg./m.$^2$;

2. a timing layer containing a 60-30-4-6 tetrapolymer of butylacrylate, diacetone acrylamide, styrene, and methacrylic acid and about 8% by weight of polyvinyl alcohol at a coverage of about 5415 mg./m.$^2$;

3. a 2:1 mixture, by weight, of polyvinyl alcohol and the polymeric mordant materials of this invention described in detail in Table I at a coverage of about 3250 mg./m.$^2$.

Following photoexposure of the aforesaid photosensitive element to provide a developable image, the photo-exposed element and the aforesaid image-receiving element were superposed in face-to-face relation with their respective supports outermost. A rupturable container retaining an alkaline processing composition was fixedly mounted transverse the leading edge of the respective superposed elements to provide a film unit. The rupturable container, comprised of an outer layer of lead foil and an inner layer of polyvinylchloride, was provided with a marginal seal of predetermined weakness such that passage of the leading edge of the film unit into and through a pair of pressure rollers would effect a rupture of such seal and uniform distribution of the aqueous processing composition between the elements of the film unit. The rupturable container positioned between the elements of the film unit retained an aqueous alkaline processing composition having the following composition:

| | |
|---|---|
| Water | 100 cc. |
| Carboxymethyl hydroxyethyl cellulose | 3.3 gms |
| Potassium hydroxide | 9.8 gms |
| 4-amino pyrazolo(3,4d)pyrimidine | 0.5 gms |
| 2-(benzimidazolyl-methyl) sulfide | 0.03 gms |
| 1-methyl imidazole | 3.4 gms |
| 6-methyl uracil | 1.6 gms |
| N-phenethyl-α-picolinium bromide | 2.4 gms |
| Colloidal silica aqueous dispersion (30% $SiO_2$) | 3.0 gms |
| N-2-hydroxyethyl-N,N',N'-tris-carboxy methyl-ethylene diamine | 0.5 gms |
| Titanium dioxide | 70.7 gms |

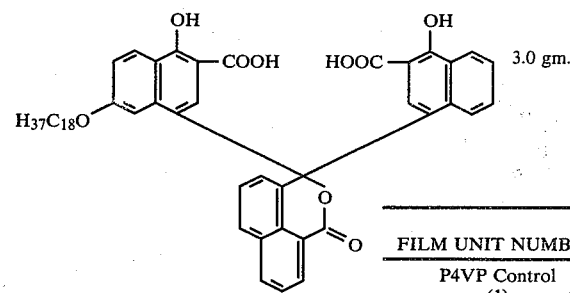

3.0 gm.

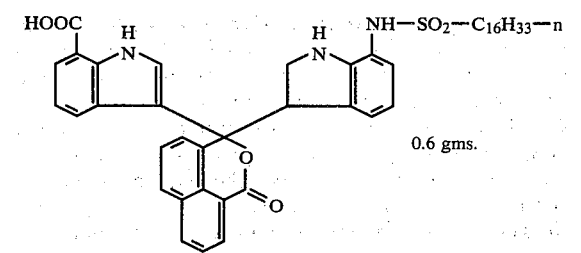

0.6 gms.

The photosensitive element was exposed through a multicolor strip wedge target which included a graduated neutral density wedge. The photosensitive element, image-receiving element, and rupturable container were then assembled into a photographic film unit in the manner described above and processed by passage into and through a pair of pressure rollers positioned at a distance of 0.030 inches (0.76 mm.) from one another, i.e., the "gap" between the rollers was 0.030 inches. The processing was carried out at room temperature. After processing was complete the maximum red, green, and blue reflection densities of the neutral column were measured for various colors with a Quantalog MacBeth Densitometer. For comparison purposes, a "control" film unit was assembled comprising the same photosensitive element and processing composition as the test units but with an image-receiving layer containing poly-4-vinylpyridine as a mordant material. The use of poly-4-vinylpyridine as a mordant in diffusion transfer process film units is well known to the art as disclosed in U.S. Pat. No. 3,148,061. Except for the substitution of poly-4-vinylpyridine, the image-receiving layers of the "control" units were identical to those of the test units.

Table 1 describes the film units of this Example designating the tertiary amines used to prepare the polymeric mordants, the degree of conversion of halomethyl groups to quaternary ammonium methyl groups, and the ratio of polyvinylalcohol to polymeric mordant in the image-receiving layer on a weight basis:

TABLE 1

| FILM UNIT NUMBER | Tertiary Amine | Degree of Conversion[a] | PVA: Mordant Ratio (w/w) |
|---|---|---|---|
| P4VP Control | | | 2:1 |
| (1) | $N(C_2H_5)_3$ | 0.88 | 2:1 |
| (2) | $(CH_3)_2N-CH_2-\phi$ | 0.93 | 2:1 |
| (3) | $CH_3-N\!\!\diagup\!\!\diagdown O$ (morpholine) | 0.87 | 2:1 |
| (4) | $CH_3-N\!\!\diagup\!\!\diagdown N-CHO$ | 0.90 | 2:1 |
| (5) | $(CH_3)_2N-CH_2CH_2OH$ | 0.92 | 2:1 |
| (6) | $(CH_3)_2N-CH_2CH_2CH_2OH$ | 1.03 | 2:1 |
| (7) | $(CH_3)_2N-CH_2CH_2CH_2-N\text{(pyrrolidinone)}$ | 0.49 | 2:1 |

[a]Based on $Cl^-$ analysis.

Table 2 presents the results of the neutral column maximum reflection density measurements as determined for red, green, and blue light.

TABLE 2

| | D-MAX | | |
|---|---|---|---|
| FILM UNIT NUMBER | RED | GREEN | BLUE |
| P4VP Control | 2.07 | 2.07 | 2.07 |
| (1) | 1.90 | 2.19 | 2.20 |
| (2) | 2.08 | 1.74 | 2.25 |
| (3) | 1.77 | 2.03 | 2.22 |
| (4) | 2.41 | 2.17 | 2.26 |
| (5) | 2.22 | 2.03 | 2.13 |
| (6) | 2.35 | 2.17 | 2.30 |
| (7) | 2.42 | 2.08 | 2.23 |

As can be seen from the data in Table 2, the novel polymeric mordants of this invention compare favorably with the mordant system of the control film unit. In addition, the balance of the maximum red, green, and blue reflection densities in these film units is generally acceptable providing neutral blacks in the high density areas of the film unit.

EXAMPLE 9

In this Example film unit (8) was prepared comprising the photosensitive element and rupturable container of Example 8 and an image-receiving element prepared as in Example 8 comprising a polymeric mordant having recurring units represented by the following formula:

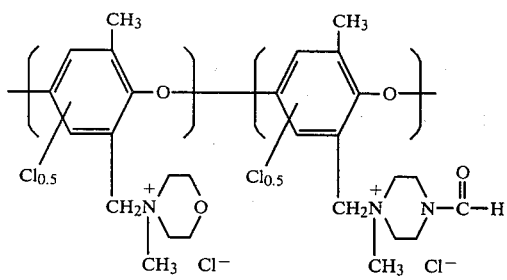

where the degree of conversion of chloromethyl groups to quaternary ammonium methyl groups was 0.90 of which 58% by weight were N-methylmorpholino and 42% by weight were N-methyl-N' formylpiperazino. This film unit was exposed and processed as in Example 8 and the maximum reflection densities after processing compared with those of the P4VP Control and film units (3) (homopolymer comprising the N-methylmorpholino quaternary group), and (4) (homopolymer comprising the N-methyl-N'-formylpiperazino quaternary group). Table 3 presents the results of these measurements:

TABLE 3

| FILM UNIT NUMBER | D-MAX | | |
|---|---|---|---|
| | RED | GREEN | BLUE |
| P4VP Control | 2.07 | 2.07 | 2.07 |
| (8) | 2.24 | 2.22 | 2.35 |
| (3) | 1.77 | 2.03 | 2.22 |
| (4) | 2.41 | 2.17 | 2.26 |

As can be seen from the data of Table 3, the maximum blue and green reflection densities of film unit (8), comprising a mordant incorporating two different quaternary nitrogen moieties on the polymeric backbone, are seen to be higher than those of either film unit (3) or (4) which comprise mordants substituted with either of the two moieties alone. In addition, the red reflection density remains at an acceptably high level and the overall balance of densities compares favorably with that of either film unit (3) or (4).

EXAMPLE 10

In this Example film unit (9) was prepared comprising the photosensitive element and processing composition of Example 8 and an image-receiving element prepared as in Example 8 comprising a polymeric mordant material comprising a 58/42 w/w% blend of, respectfully, the homopolymer used in film unit (3), comprising N-methylmorpholino quaternary ammonium methyl groups, and (4), comprising N-methyl-N'-formylpiperazino quaternary ammonium methyl groups. This film unit was exposed and processed as in Example 8 and the maximum reflection densities after processing compared with those of film units (3), (4), and (8). Table 4 presents the results of these measurements:

TABLE 4

| FILM UNIT NUMBER | D-MAX | | |
|---|---|---|---|
| | RED | GREEN | BLUE |
| (3) | 1.77 | 2.03 | 2.22 |
| (4) | 2.41 | 2.17 | 2.26 |
| (8) | 2.24 | 2.22 | 2.35 |
| (9) | 2.35 | 2.21 | 2.29 |

Table 4 indicates that another method of varying the mordanting performance of the image-receiving layer is by employing a mixture of the homopolymers of this invention.

Since certain changes may be made in the above products and processes without departing from the scope of the invention herein involved, it is intended that all matter contained in the above description shall be interpreted as illustrative and not in a limiting sense.

What is claimed is:

1. A diffusion transfer film unit which comprises a photosensitive system comprising at least one photosensitive silver halide emulsion layer having associated therewith a diffusion transfer process image dye-providing material and an image-receiving layer adapted to receive an image dye-providing material after photoexposure and processing, said image-receiving layer comprising a linear aromatic polymeric mordant having recurring phenylene ether units of the formula:

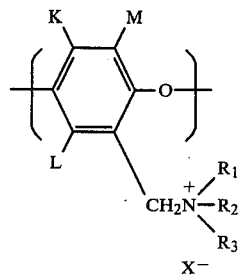

where K and L are independently hydrogen; lower alkyl; cycloalkyl; lower alkoxy; aryl; aryloxy; aralkyl; alkaryl; or halogen; M is hydrogen; lower alkyl; cycloalkyl; lower alkoxy; aryl; aryloxy; aralkyl; alkaryl; halogen; or

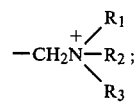

$R_1$, $R_2$, and $R_3$ are independently lower alkyl; substituted lower alkyl; aryl; cycloalkyl; aralkyl; alkaryl; or at least two of $R_1$, $R_2$, and $R_3$ and the nitrogen atom to which they are bonded constitute a substituted or unsubstituted N-containing heterocyclic ring; and $X^-$ is an anion.

2. A diffusion transfer film unit of claim 1 wherein said unit is an integral negative-positive film unit which comprises:

a photosensitive element comprising a composite structure containing, as essential layers, in sequence, an opaque layer, said photosensitive system, said image-receiving layer, and a transparent layer; and means retaining an aqueous alkaline processing composition integrated with said film unit so that said processing composition can be distributed between said photosensitive system and said image-receiving layer, said processing composition providing a light-reflecting pigment such that the distribution of said processing composition between said photosensitive system and said image-receiving layer provides a light-reflecting layer against which a dye image formed in said image-receiving layer can be viewed.

3. A diffusion transfer film unit of claim 1 wherein said unit is an integral negative-positive film unit which comprises:
a photosensitive element comprising, as essential layers, in sequence, a transparent layer, said image-receiving layer, a processing composition permeable light-reflecting layer against which a dye image formed in said image-receiving layer can be viewed, and said photosensitive system;
a transparent sheet superposed substantially coextensive the surface of said photosensitive element opposite said transparent layer; and
means retaining an aqueous alkaline processing composition, which includes an opacifying agent, integrated with said film unit such that said processing composition can be distributed between said photosensitive system and said transparent sheet.

4. A diffusion transfer film unit of claim 1 wherein said polymeric mordant comprises recurring phenylene ether units wherein at least one of K and L is chlorine or bromine.

5. A diffusion transfer film unit of claim 4 wherein said polymeric mordant comprises from about 10 mole percent to about 200 mole percent of said chlorine or bromine.

6. A diffusion transfer film unit of claim 5 wherein said polymeric mordant comprises about 50 mole percent of said chlorine or bromine.

7. A diffusion transfer film unit of claim 6 wherein at least one of K and L is chlorine, M is methyl, and $X^-$ is chloride.

8. A diffusion transfer film unit of claim 1 wherein M is hydrogen.

9. A diffusion transfer film unit of claim 8 wherein K and L are methyl and $X^-$ is chloride.

10. A diffusion transfer film unit of claim 1 wherein at least 80% of said phenylene ether units are substituted with at least one quaternary nitrogen group.

11. A diffusion transfer film unit of claim 1 wherein said mordant comprises from about 10% to about 100% of the image-receiving layer material.

12. A diffusion transfer film unit of claim 1 wherein said image-receiving layer comprises a mixture of said polymeric mordant material and a hydrophilic polymer.

13. A diffusion transfer film unit of claim 12 wherein said image-receiving layer comprises a mixture of said polymeric mordant and polyvinyl alcohol.

14. A diffusion transfer film unit of claim 13 wherein the ratio by weight of said polyvinyl alcohol to said polymeric mordant is about 2:1.

15. A diffusion transfer film unit of claim 1 wherein said polymeric mordant provides at least two differently substituted quaternary nitrogen groups.

16. A diffusion transfer film unit of claim 1 wherein said image-receiving layer comprises a mixture of two or more of said polymeric mordants, each said polymeric mordant of the mixture providing a different quaternary nitrogen group.

17. An integral negative-positive diffusion transfer film unit which comprises in a superposed fixed relationship before and after photo-exposure:
a photosensitive element comprising an opaque support carrying a plurality of layers including at least one photosensitive silver halide layer having associated therewith a diffusion transfer process image dye-providing material; and
an image-receiving element comprising a transparent support carrying an image-receiving layer adapted to receive said image dye-providing material after photoexposure and processing, said image-receiving layer comprising a linear aromatic polymeric mordant having recurring phenylene ether units of the formula

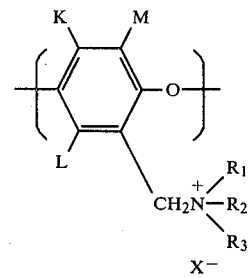

where K and L are independently hydrogen; lower alkyl; cycloalkyl; lower alkoxy; aryl; aryloxy; aralkyl; alkaryl; or halogen; M is hydrogen, lower alkyl; cycloalkyl; lower alkoxy; aryl; aryloxy; aralkyl; alkaryl; halogen; or

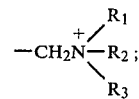

$R_1$, $R_2$, and $R_3$ are independently lower alkyl; substituted lower alkyl; aryl; cycloalkyl; aralkyl; alkaryl; or at least two of $R_1$, $R_2$, and $R_3$ and the nitrogen atom to which they are bonded constitute a substituted or unsubstituted N-containing heterocyclic ring; and $X^-$ is an anion;
a rupturable container releasably holding an aqueous, alkaline, opaque processing composition including a light-reflecting pigment;
said rupturable container being positioned transverse the leading edge of said film unit so as to release said processing composition for distribution between said elements after photoexposure to provide a light-reflecting layer against which a dye image formed in said image-receiving layer may be viewed through said transparent support without separation of said superposed photosensitive and image-receiving elements.

18. A diffusion transfer film unit of claim 17 wherein said polymeric mordant comprises recurring phenylene ether units wherein at least one of K and L is chlorine or bromine.

19. A diffusion transfer film unit of claim 18 wherein said polymeric mordant comprises from about 10 mole percent to about 200 mole percent of said chlorine or bromine.

20. A diffusion transfer film unit of claim 19 wherein said polymeric mordant comprises about 50 mole percent of said chlorine or bromine.

21. A diffusion transfer film unit of claim 20 wherein at least one of K and L is chlorine, M is methyl, and $X^-$ is chloride.

22. A diffusion transfer film unit of claim 17 wherein M is hydrogen.

23. A diffusion transfer film unit of claim 22 wherein K and L are methyl and $X^-$ is chloride.

24. A diffusion transfer film unit of claim 17 wherein at least 80% of said phenylene ether units are substituted with at least one quaternary nitrogen group.

25. A diffusion transfer film unit of claim 17 wherein said mordant comprises from about 10% to about 100% of the image-receiving layer material.

26. A diffusion transfer film unit of claim 17 wherein said image-receiving layer comprises a mixture of said polymeric mordant material and a hydrophilic polymer.

27. A diffusion transfer film unit of claim 26 wherein said image-receiving layer comprises a mixture of said polymeric mordant and polyvinyl alcohol.

28. A diffusion transfer film unit of claim 27 wherein the ratio by weight of said polyvinyl alcohol to said polymeric mordant is about 2:1.

29. A diffusion transfer film unit of claim 17 wherein said polymeric mordant provides at least two differently substituted quaternary nitrogen groups.

30. A diffusion transfer film unit of claim 17 wherein said image-receiving layer comprises a mixture of two or more of said polymeric mordants, each said polymeric mordant of the mixture providing a different quaternary nitrogen group.

31. An image-receiving element which comprises a support carrying an image-receiving layer comprising a linear aromatic polymeric mordant having recurring phenylene ether units of the formula:

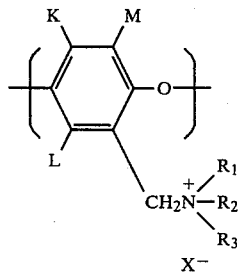

where K and L are independently hydrogen; lower alkyl; cycloalkyl; lower alkoxy; aryl; aryloxy; aralkyl; alkaryl; or halogen, provided that at least one of K and L is chlorine or bromine; M is hydrogen; lower alkyl, cycloalkyl; lower alkoxy; aryl; aryloxy; aralkyl; alkaryl; halogen; or

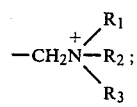

$R_1$, $R_2$, and $R_3$ are independently lower alkyl; substituted lower alkyl; aryl, cycloalkyl; aralkyl; alkaryl; or at least two of $R_1$, $R_2$, and $R_3$ and the nitrogen atom to which they are bonded constitute a substituted or unsubstituted N-containing heterocyclic ring; and $X^-$ is an anion.

32. An image-receiving element of claim 31 wherein said polymeric mordant comprises from about 10 mole percent to about 200 mole percent of said chlorine or bromine.

33. An image-receiving element of claim 32 wherein said polymeric mordant comprises about 50 mole percent of said chlorine or bromine.

34. An image-receiving element of claim 33 wherein at least one of K and L is chlorine, M is methyl, and $X^-$ is chloride.

35. An image-receiving element of claim 31 wherein at least 80% of said phenylene ether units are substituted with at least one quaternary nitrogen group.

36. An image-receiving element of claim 31 wherein said mordant comprises from about 10% to about 100% of the image-receiving layer material.

37. An image-receiving element of claim 31 wherein said image-receiving layer comprises a mixture of said polymeric mordant material and a hydrophilic polymer.

38. An image-receiving element of claim 37 wherein said image-receiving layer comprises a mixture of said polymeric mordant and polyvinyl alcohol.

39. An image-receiving element of claim 38 wherein the ratio by weight of said polyvinyl alcohol to said polymeric mordant is about 2:1.

40. An image-receiving element of claim 31 wherein said polymeric mordant provides at least two differently substituted quaternary nitrogen groups.

41. An image-receiving element of claim 31 wherein said image-receiving layer comprises a mixture of two or more of said polymeric mordants, each said polymeric mordant of the mixture providing a different quaternary nitrogen group.

42. A process for forming diffusion transfer images which comprises, in combination, the steps of exposing a photosensitive system comprising at least one photosensitive silver halide emulsion layer having associated therewith a diffusion transfer image dye-providing material; contacting said exposed photosensitive system with an aqueous alkaline processing composition effecting thereby development of said silver halide emulsion(s) and the formation of an image-wise distribution of diffusible image dye-providing material; transferring, by imbibition, at least a portion of said imagewise distribution of diffusible image dye-providing material to a superposed image-receiving layer comprising a linear aromatic polymeric mordant having recurring phenylene ether units of the formula:

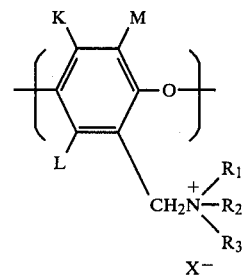

where K and L are independently hydrogen; lower alkyl, cycloalkyl; lower alkoxy; aryl; aryloxy; aralkyl; alkaryl; or halogen; M is hydrogen, lower alkyl, cycloalkyl; lower alkoxy; aryl; aryloxy; aralkyl; alkaryl; halogen; or

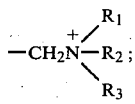

$R_1$, $R_2$, and $R_3$ are independently lower alkyl; substituted lower alkyl; aryl; cycloalkyl; aralkyl; alkaryl; or at least two of $R_1$, $R_2$, and $R_3$ and the nitrogen atom to which they are bonded constitute a substituted or unsubstituted N-containing heterocyclic ring; and $X^-$ is an anion.

43. A process of claim 42 wherein said polymeric mordant comprises recurring phenylene ether units wherein at least one of K and L is chlorine or bromine.

44. A process of claim 43 wherein said polymeric mordant comprises from about 10 mole percent to about 200 mole percent of said chlorine or bromine.

45. A process of claim 44 wherein said polymeric mordant comprises about 50 mole percent of said chlorine or bromine.

46. A process of claim 45 wherein at least one of K and L is chlorine, M is methyl, and $X^-$ is chloride.

47. A process of claim 42 wherein M is hydrogen.

48. A process of claim 47 wherein K and L are methyl and $X^-$ is chloride.

49. A process of claim 42 wherein at least 80% of said phenylene ether units are substituted with at least one quaternary nitrogen group.

50. An image-receiving element comprising a support carrying an image-receiving layer comprising a linear aromatic polymeric mordant having recurring phenylene ether units of the formula

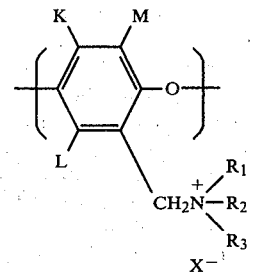

wherein each of K and L is methyl; M is hydrogen; each of $R_1$, $R_2$, and $R_3$ is independently lower alkyl; substituted lower alkyl; aryl; cycloalkyl; aralkyl; alkaryl; or at least two of $R_1$, $R_2$, and $R_3$ and the nitrogen atom to which they are bonded constitute a substituted or unsubstituted N-containing heterocyclic ring; and $X^-$ is chloride.

* * * * *